US012370667B2

(12) United States Patent
Takeuchi et al.

(10) Patent No.: US 12,370,667 B2
(45) Date of Patent: Jul. 29, 2025

(54) AUXILIARY GRIP FOR IMPACT TOOL

(71) Applicant: MAKITA CORPORATION, Anjo (JP)

(72) Inventors: Hajime Takeuchi, Anjo (JP); Yoji Inoue, Anjo (JP); Hiroki Takesashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 25 days.

(21) Appl. No.: 18/215,984

(22) Filed: Jun. 29, 2023

(65) Prior Publication Data

US 2024/0066680 A1 Feb. 29, 2024

(30) Foreign Application Priority Data

Aug. 30, 2022 (JP) ................................ 2022-136620

(51) Int. Cl.
*B25F 5/02* (2006.01)

(52) U.S. Cl.
CPC .................................. *B25F 5/026* (2013.01)

(58) Field of Classification Search
CPC ....... B25B 21/02; B25B 21/00; B25B 21/026; B25B 23/16; B25B 23/147; B25B 23/1475; B25B 23/1453; B25B 23/1405; B25B 19/00; B25D 11/04; B25D 11/066; B25D 16/00; B25D 16/003; B25D 16/006; B25D 2216/0023; B25F 5/026; B25G 1/063
See application file for complete search history.

(56) References Cited

U.S. PATENT DOCUMENTS

| | | | | | |
|---|---|---|---|---|---|
| 4,276,675 | A * | 7/1981 | Pioch | F16B 7/048 | 74/544 |
| 4,719,976 | A * | 1/1988 | Bleicher | B25D 16/003 | 173/205 |
| 4,977,966 | A * | 12/1990 | Farber | B25B 21/026 | 173/159 |
| 5,049,012 | A * | 9/1991 | Cavedo | B25F 5/026 | 408/241 R |
| 5,157,807 | A * | 10/1992 | Keller | B25F 5/006 | 16/431 |
| 5,170,532 | A * | 12/1992 | Holmin | B25D 17/043 | 81/177.1 |
| D343,345 | S * | 1/1994 | Ogawa | D8/69 | |
| 5,893,295 | A * | 4/1999 | Bronnert | B62K 23/04 | 477/194 |
| 6,317,930 | B1 * | 11/2001 | Hung | B25F 5/026 | 403/97 |
| 6,553,627 | B1 * | 4/2003 | Horler | B25G 1/00 | 16/427 |
| 6,786,683 | B2 * | 9/2004 | Schaer | B25F 5/003 | 408/8 |
| D591,130 | S * | 4/2009 | Palermo | D8/69 | |
| D606,377 | S * | 12/2009 | Ho | D8/69 | |

(Continued)

FOREIGN PATENT DOCUMENTS

JP 6612157 B2 11/2019

*Primary Examiner* — Dariush Seif
(74) *Attorney, Agent, or Firm* — Oliff PLC

(57) ABSTRACT

An auxiliary grip for an impact tool capable of enhancing a shock absorbing function, comprising a grip shaft extending orthogonally to the impact direction, a tubular grip body covering the grip shaft, and a connecting mechanism for connecting the grip body at one end of the grip shaft.

11 Claims, 10 Drawing Sheets

(56) References Cited

U.S. PATENT DOCUMENTS 7,676,890 B2 * 3/2010 Zhang ..................... B25F 5/006 16/431
7,708,260 B2 * 5/2010 Eicher ..................... B25F 5/026 267/207
8,371,708 B2 * 2/2013 Nagasaka ............... B25B 23/18 173/217
8,407,860 B2 * 4/2013 Brennenstuhl .......... B25F 5/026 16/422
8,756,766 B2 * 6/2014 Zhang ..................... B25F 5/026 16/431
8,914,947 B2 * 12/2014 Weiss ...................... B25F 5/006 16/431
9,242,363 B2 1/2016 Moessnang et al.
9,260,154 B2 * 2/2016 Mauch ................... B62K 23/04
9,393,711 B2 * 7/2016 Myrhum, Jr. ............. B26F 1/36
D835,959 S * 12/2018 Eardley ............................ D8/67
D853,815 S * 7/2019 Yaschur ........................... D8/69
10,537,984 B2 * 1/2020 Steingruber ............ B25F 5/006
11,858,109 B2 * 1/2024 Lachica Koch ........ B25F 5/026
2005/0000714 A1 * 1/2005 Milbourne .............. B25B 21/00 173/176
2005/0087353 A1 * 4/2005 Oki ......................... B25F 5/006 173/162.2
2006/0219419 A1 * 10/2006 Sugiyama ............... B25F 5/026 173/162.2
2007/0209162 A1 * 9/2007 McRoberts ............. B25F 5/026 16/426
2008/0078067 A1 * 4/2008 Nicolantonio .......... B25F 5/026 16/110.1
2008/0148524 A1 * 6/2008 Wiker ..................... B25F 5/006 16/431
2009/0000434 A1 * 1/2009 Shinma .................. B25D 17/04 81/491
2009/0038120 A1 * 2/2009 Eicher ................... B24B 23/028 173/170
2009/0178520 A1 * 7/2009 Engelfried .............. B25F 5/026 81/489
2009/0307875 A1 * 12/2009 Nakashima ............. B25F 5/026 16/436
2010/0005629 A1 * 1/2010 Di Nicolantonio ..... B25F 5/026 16/426
2010/0064480 A1 * 3/2010 Martin .................... B25F 5/026 16/426
2010/0064481 A1 * 3/2010 Martin .................... B25F 5/026 16/426
2010/0064482 A1 * 3/2010 Martin .................... B25F 5/026 16/426
2010/0206595 A1 * 8/2010 Kamegai ................. B25F 5/006 173/162.2
2010/0282484 A1 * 11/2010 Moessnang ............. B25F 5/026 16/421
2011/0003541 A1 * 1/2011 Liu ......................... B25F 5/026 451/359
2011/0011609 A1 * 1/2011 Simm ..................... B25F 5/026 173/171
2011/0120741 A1 * 5/2011 Limberg ................... B25F 5/02 16/421
2012/0312572 A1 * 12/2012 Nemetz ................... B25F 5/006 248/220.22
2013/0161049 A1 * 6/2013 Ikuta .................. B23Q 11/0046 173/198
2013/0206440 A1 * 8/2013 Ikuta .................. B23Q 11/0071 173/198
2014/0138114 A1 * 5/2014 Takeuchi ........... B23Q 11/0071 173/198
2014/0144658 A1 * 5/2014 Schmid .................. B25D 17/24 173/90
2014/0196921 A1 * 7/2014 Kondo ..................... B25G 1/00 173/46
2014/0223695 A1 * 8/2014 Rieger .................... B25F 5/006 16/421
2014/0231113 A1 * 8/2014 Steurer ..................... B25F 5/00 173/1
2014/0251649 A1 * 9/2014 Kondo .................... B25F 5/026 16/426
2014/0251650 A1 * 9/2014 Kondo ...................... B25F 5/02 173/171
2014/0318821 A1 * 10/2014 Wyler ..................... B25F 5/006 173/104
2014/0352114 A1 * 12/2014 Yoshikane ............. B25D 17/04 16/426
2015/0041170 A1 * 2/2015 Yoshikane ............. B25D 16/00 173/104
2015/0144366 A1 * 5/2015 Machida ................ B25D 16/00 173/104
2015/0174753 A1 * 6/2015 Kamiya .................... B25F 5/02 16/426
2015/0209952 A1 * 7/2015 Nishii ..................... B25F 5/026 173/162.2
2015/0266176 A1 * 9/2015 Takeuchi ............... B25D 17/24 173/117
2015/0328760 A1 * 11/2015 Ikuta .................... B25D 17/043 173/117
2016/0075007 A1 * 3/2016 Kutsuna .................. B25F 5/006 173/210
2016/0136801 A1 * 5/2016 Furusawa ............... B25F 5/026 173/162.2
2016/0279782 A1 * 9/2016 Ullrich ................... B25D 16/00
2016/0288308 A1 * 10/2016 Kuhnle ................... B25F 5/001
2016/0311102 A1 * 10/2016 Ebner ................. H01M 50/247
2017/0021478 A1 * 1/2017 Junkers ................. B25B 13/488
2017/0106517 A1 * 4/2017 Machida .............. B25D 11/102
2019/0030622 A1 * 1/2019 Carlson ................... B25F 5/026
2019/0255687 A1 * 8/2019 Schneider ............... B25B 21/02
2020/0122281 A1 * 4/2020 Wierer ............... B23Q 11/0092
2020/0262037 A1 * 8/2020 Schneider ............. B25B 21/026
2021/0039240 A1 * 2/2021 Iida ........................ B25D 17/04
2021/0100170 A1 * 4/2021 Suzuki ................... A01G 3/053
2021/0260733 A1 * 8/2021 Fischer ..................... B25F 5/02
2021/0260734 A1 * 8/2021 Kubale ................... B25B 21/02
2022/0281091 A1 * 9/2022 Cholst ..................... B25F 5/026
2023/0011055 A1 * 1/2023 Kaneko ..................... B25F 5/00
2024/0066680 A1 * 2/2024 Takeuchi ................ B25F 5/026

* cited by examiner

AUXILIARY GRIP FOR IMPACT TOOL

CROSS-REFERENCE TO RELATED APPLICATION

The present patent application claims priority to Japanese Patent Application No. 2022-136620, filed Aug. 30, 2022, which is incorporated herein by reference in their entireties for all purposes.

FIELD OF INVENTION

The present invention relates to an auxiliary grip for an impact tool that enhances the shock absorbing function.

BACKGROUND

Conventional auxiliary grips are designed to support a grip body with an elastic material such as a sponge being disposed between the grip base coupled to a tool body to absorb the impact the user's hand. However, there has been a problem with the conventional impact absorbing structure that when a large pressing load to a grip body in an impact direction, the shock absorbing function (anti-vibration function) of the elastic material may be reduced, thereby increasing the strain on the user.

Therefore, there is a need for an improvement of the shock absorbing function of the auxiliary grip. The present disclosure aims to improve the shock absorbing function of the auxiliary grip.

SUMMARY OF THE DISCLOSURE

According to one aspect of the present disclosure, the auxiliary grip for an impact tool may include, for example, a grip shaft extending orthogonally to an impact direction from a tool body being configured for a tool bit to move reciprocally in the impact direction, and a tubular grip body covering the grip shaft. The auxiliary grip for the impact tool may include, for example, a connecting mechanism for connecting the grip body at an end of the grip shaft so the grip body can be slidable in the impact direction.

Therefore, the shock in the impact direction is absorbed as the grip body slidably moves in the impact direction with respect to the grip shaft. This improves the shock absorbing function in the impact direction for the user holding the grip body. As a result, the strain on the user of the impact tool may be reduced.

According to another aspect of the present disclosure, the impact tool may include, for example, an auxiliary grip for an impact tool. This improves the shock absorbing function in the impact direction for the user who uses the impact tool while holding the auxiliary grip body. As a result, the strain on the user of the impact tool may be reduced.

DETAILED DESCRIPTION

Figure 1:
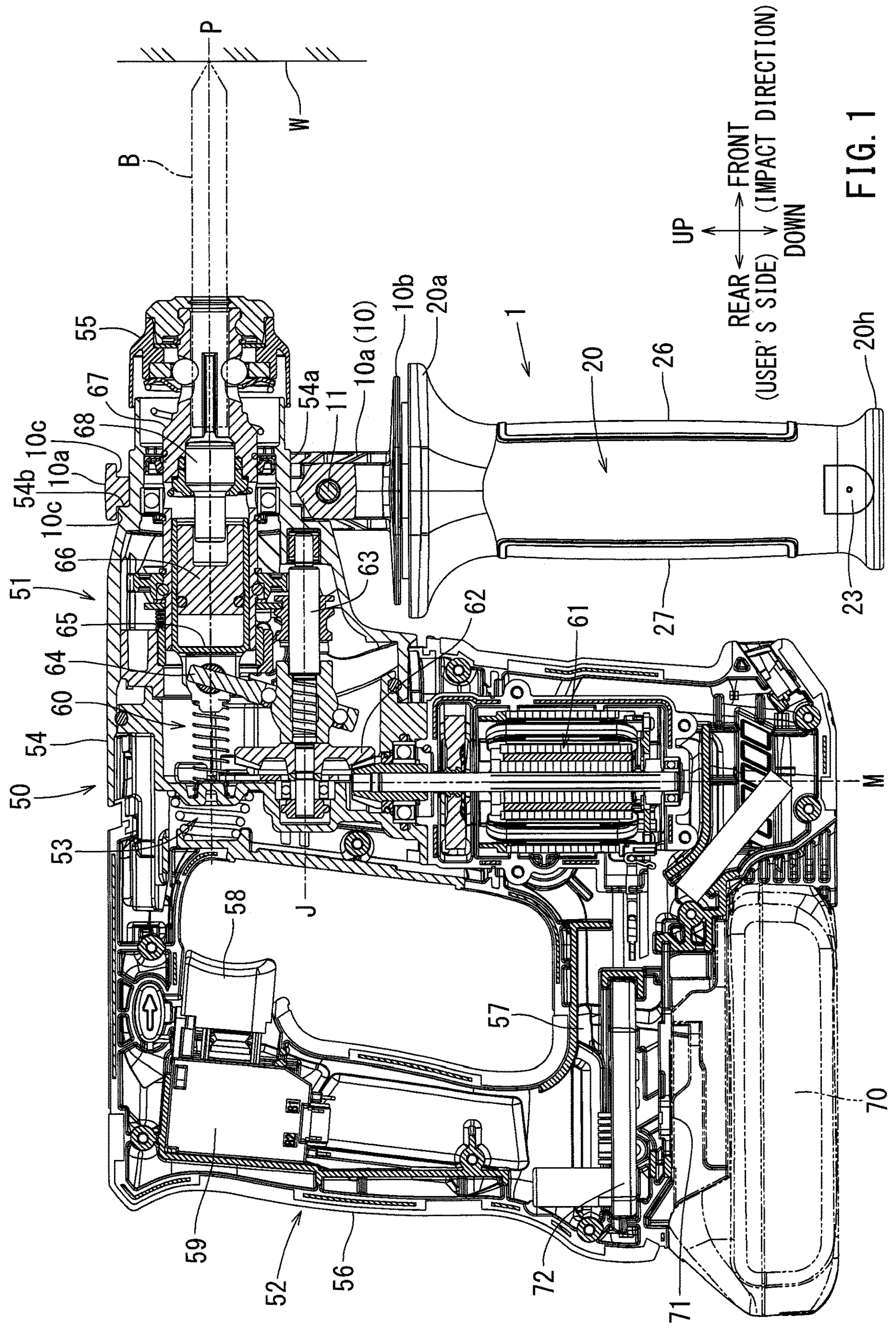
FIG. 1 is a vertical sectional view of an impact tool.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In one or more embodiments, the auxiliary grip for the impact tool may include, for example, a first pad provided between an end of a grip shaft and a grip body for absorbing the shock in an impact direction against the grip shaft of the grip body. The shock in the impact direction of the grip body is absorbed by the first pad, which improves the shock absorbing function of the auxiliary grip.

In one or more embodiments, the auxiliary grip may include, for example, a second pad provided between a base portion on a side of the tool body of the grip shaft and a grip body to absorb the shock in the impact direction against the grip shaft of the grip body.

Therefore, the shock in the impact direction of the grip body is absorbed by the second pad, which improves the shock absorbing function of the auxiliary grip to reduce the shock.

In one or more embodiments, for example, the second pad may include a lateral side adjacent to a grip shaft in a direction orthogonal to the impact direction and a vertical side having a thickness thicker than the lateral side and being adjacent to the grip shaft in the impact direction.

Therefore, the shock in the impact direction is more reliably absorbed by the vertical side of the second pad.

In one or more embodiments, for example, the grip shaft may be provided with a third pad that is harder than the second pad and comes into contact with the grip body after the second pad has deformed.

Therefore, when the shock exceeding the shock absorbing function of the second pad is applied to the grip body, a direct contact of the grip body with the grip shaft may be avoided by the third pad. As a result, the shock impact can be fully absorbed by the absorbing function of the auxiliary.

In one or more embodiments, for example, the connecting mechanism may have a contact surface provided on at least one of the grip shaft or the grip body so as to extend in the impact direction with which the other comes into contact.

Therefore, the grip body supported by the grip shaft can be slidable in the impact direction when the other one of the grip shaft or the grip body contacts with the contact surface.

In one or more embodiments, for example, the connecting mechanism may include a passing through hole for the grip shaft to pass in the direction that is orthogonal to the impact direction, and a connecting member extending through the passing through hole and connected to the grip body. For example, the connecting member may have a flat surface as a contact surface that is parallel to the impact direction, while the passing through hole of the grip shaft has a receiving surface as a contact surface facing the flat surface of the connecting member.

Therefore, the connecting member moves in parallel to the impact direction (radial direction of the connecting member) without rotating about an axis so as to come slidably in contact with the receiving surface, causing the grip body to slide in the impact direction. As a result, the shock in the impact direction is absorbed.

In one or more embodiments, for example, the passing through hole of the grip shaft may have a long groove hole shape elongated in the impact direction, and a receiving surface on an inner surface of the passing through hole.

Therefore, the simply structured connecting mechanism ensures sliding movement with respect to the grip shaft of the grip body.

In one or more embodiments, for example, the connecting mechanism may include a passing through hole for the grip shaft to pass through in the impact direction, and a connecting member passing through the passing through hole and to be connected to the grip body.

Therefore, the movement of the connecting member in the passing through hole of the grip shaft in the impact direction (axial direction of the connecting member) causes the grip body to slide with respect to the grip shaft in the impact direction, thereby absorbing the shock in the impact direction.

In one or more embodiments, the grip body has an elastomer layer on at least an outer surface in the impact direction, and the elastomer layer is integrally formed with a resin layer that is harder than the elastomer layer.

Therefore, the shock in the impact direction is also absorbed by the elastomer layer, thereby reducing the strain on a user.

As shown in FIG. 1, an auxiliary grip 1 attaches to an impact tool 50, which refers to a hammer drill. The impact tool 50 is a relatively large handheld tool that includes a tool body 51, which has an impact mechanism 60, and a loop-shaped handle 52. Also referred in FIG. 1 is a plurality set of a vibration damping mechanism 53 being disposed between the tool body 51 and the handle 52 for providing a vibration damping structure that is elastically supported rather than rigidly coupled in between. The vibration damping mechanism 53 is mainly composed of a compression coil spring to absorb the shock generated on the side of the impact mechanism 60 of the tool body 51 and to prevent the shock from being transmitted to the side of the handle 52.

Still in FIG. 1, the tool body 51 includes a body housing 54. The impact mechanism 60 is mounted within the body housing 54 and includes an electric motor 61 as a drive source. The electric motor 61 is supported in a vertical orientation with a motor axis M positioned parallel in an up/down direction. The rotational output of the electric motor 61 is transmitted to an intermediate shaft 63 via a bevel gear 62. The intermediate shaft 63 is rotatably supported about the axis J in a lateral orientation with the axis J positioned parallel in a front/rear direction.

Still in FIG. 1, the rotation of the intermediate shaft 63 causes a power conversion member 64 to tilt in a front/rear direction. The power conversion member 64 is connected to a piston 65. Therefore, when the intermediate shaft 63 rotates, the piston 65 reciprocally moves in the front/rear direction. Due to the air pressure generated by the reciprocal movement of the piston 65, a striker 66 moves forward and comes into contact with an intermediate piece 68. The intermediate piece 68 strikes a rear end of the drill bit B. The striking force of the intermediate piece 68 causes the drill bit B to be struck toward a workpiece W. In the present embodiment, the axis of the drill bit B corresponds to an output axis P. The drill bit B is struck forward (impact direction) along the output axis P.

Still in FIG. 1, the rotation of the intermediate shaft 63 causes a tool holder 67 to rotate about the output axis P. A rear side of the tool holder 67 has a cylindrical shape. The piston 65 and the striker 66 are reciprocally accommodated on an inner circumferential side of the tool holder 67. The drill bit B is removably attached to a front side of the tool holder 67. The drill bit B projects forward from a chuck 55 provided at a front part of the main housing 54. The rotational output of the electric motor 61 provides a rotational motion about the output axis P and the striking motion in the direction of the output axis P to the drill bit B that is attached to the tool holder 67.

Still in FIG. 1, the handle 52 has a loop shape extending over between an upper rear side and a lower rear side of the tool body 51. The handle 52 has a grip 56 for a user to actually hold and a pedestal 57. The grip 56 is provided to extend upwardly from the rear part of the pedestal 57. An upper part of the grip 56 is connected to the upper rear side of the tool body 51 via the vibration damping mechanism 53.

Still in FIG. 1, a switching lever 58 is provided at the front side (inside the loop) of the grip 56. A switch body 59 is mounted inside the rear side of the switch lever 58. When the switch lever 58 is pulled rearward with a fingertip of a hand holding the grip 56 (for example, right hand), the switch body 59 is turned ON to activate the electric motor 61.

Still in FIG. 1, a battery mount 71 for mounting a single battery pack 70 is provided on a lower side of the pedestal 57. The battery pack 70 is a slide mounting-type lithium ion battery having a rectangular parallelepiped shape, which is allowed to slide forward with respect to the battery mount 71 to be mounted. The electric motor 61 is activated with the electric power of the mounted battery pack 70 as a power source. A controller 72 having a rectangular flat plate shape is mounted inside the pedestal 57. The controller 72 mainly controls the operation of the electric motor 61.

Still in FIG. 1, the impact tool 50 is used by a user holding a grip 56 of the handle 52 with one hand (e.g. right hand) and the auxiliary grip 1 with the other hand (e.g. left hand). The auxiliary grip 51 is mounted on a cylindrical grip mounting portion 54*a* provided at the front of the body housing 54. The auxiliary grip 1 mounted to the grip mounting portion 54*a* extends in a direction intersecting the impact direction (output axis P).

Figure 2:
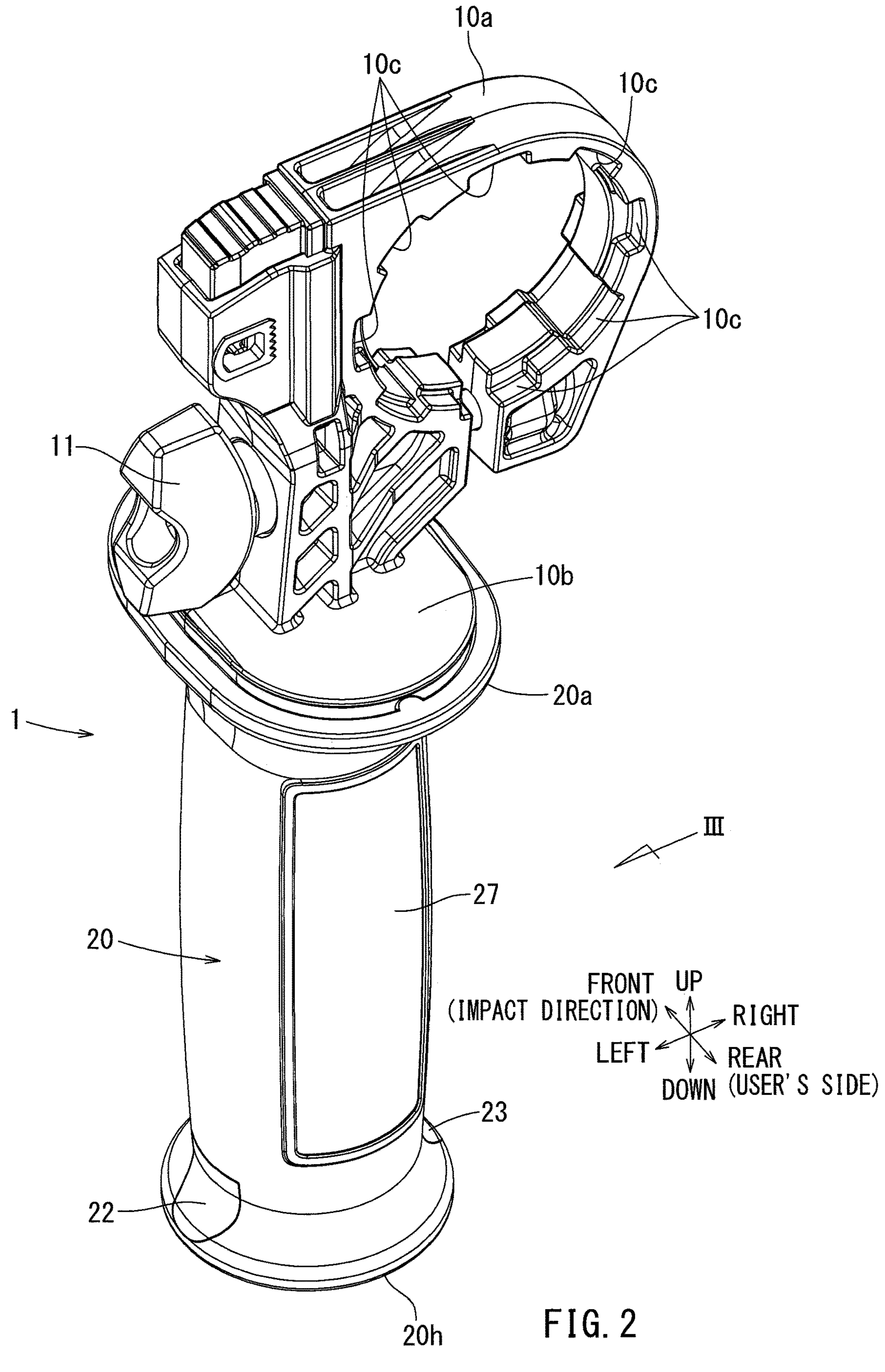
FIG. 2 is a perspective view of an entire auxiliary grip according to a first embodiment.
Figure 3:
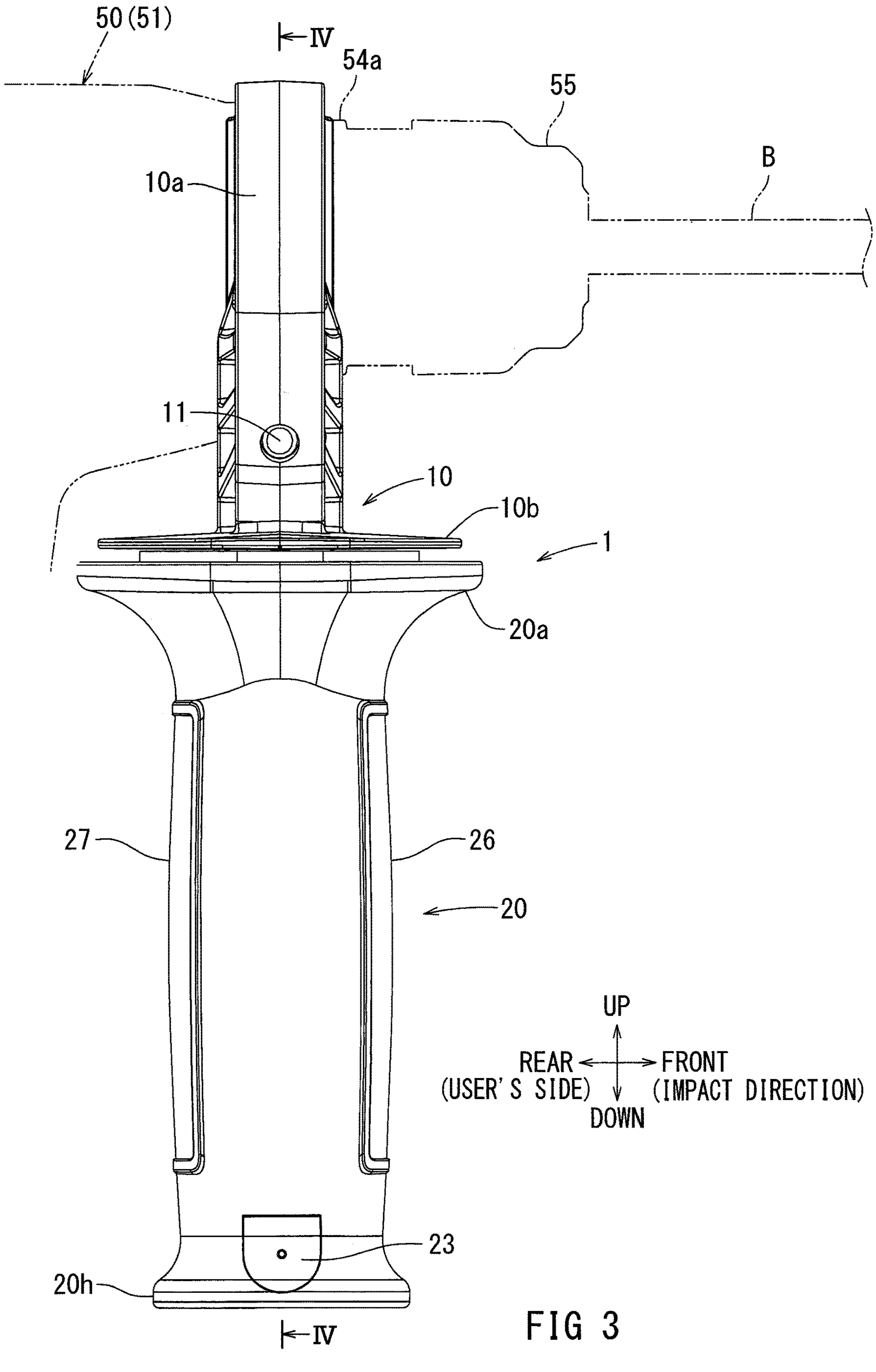
FIG. 3 is a right-side view of the auxiliary grip according to the first embodiment, which is a side view as seen from an arrow III in FIG. 2.
Figure 4:
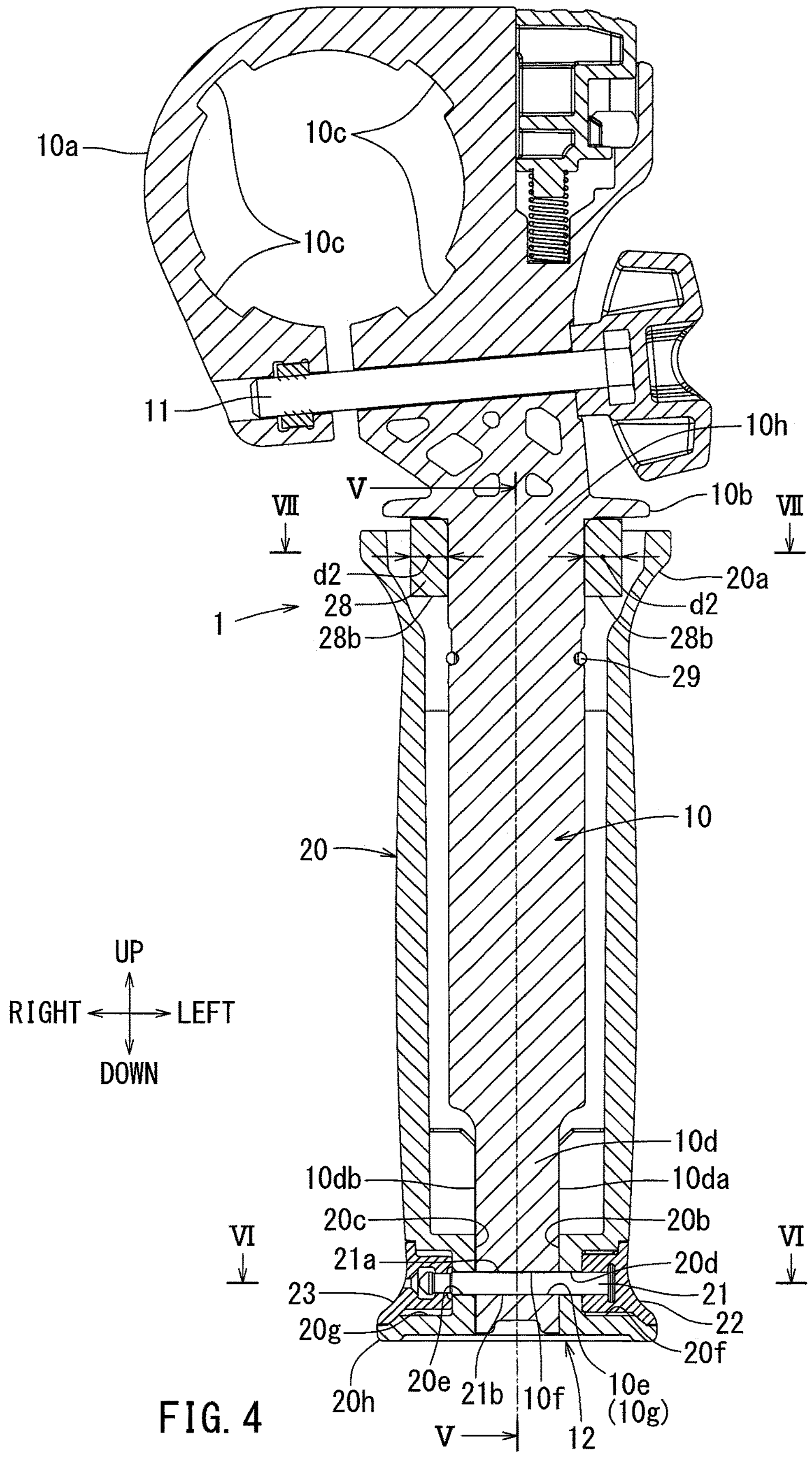
FIG. 4 is a vertical sectional view of the auxiliary grip according to the first embodiment, which is a cross-sectional view taken along line IV-IV in FIG. 3.

FIGS. 2 to 4 show the auxiliary grip 1 removed from the grip mounting portion 54*a*. The auxiliary grip 1 includes a grip shaft 10 and a grip body 20. The grip shaft 10 extends from the grip mounting portion 54*a* in a direction substantially orthogonal to the impact direction.

As shown in FIG. 2, an elongated circular flange 10*b* is integrally formed at an upper part of the grip shaft 10. An annular tightening portion 10*a* is integrally formed on a top of the flange 10*b*. The tightening portion 10*a* is displaced in a diameter reduction direction by tightening a fixing screw 11. Tightening the fixing screw 11 with the grip mounting portion 54*a* positioned on the inner circumferential side of the tightening portion 10*a* allows the grip shaft 10 to be coupled with the grip mounting portion 54*a*.

Still in FIG. 2, a plurality of engagement recesses 10*c* is provided on the inner circumferential side of the tightening portion 10*a*. The position of the grip shaft 10 about the output axis P is fixed when an engagement projection 54*b* on the side of the grip mounting portion 54*a* (see FIG. 1) is fitted into any one of the engagement recesses 10*c*.

As shown in FIGS. 2 and 3, the tightening portion 10*a* is elastically deformed in a diameter increasing direction by loosening the fixing screw 11. This loosens the connection of the tightening portion 10*a* with respect to the grip mounting portion 54*a* such that the auxiliary grip 1 can be removed from the grip mounting portion 54*a*. Further, loosening the connection of the tightening portion 10*a* with the grip mounting portion 54*a* makes it possible to change the position of the grip shaft 10 around the output axis P. The fixing screw 11 with the position changed is tightened, causing the engagement projection 54*b* to fit into another engagement recess 10*c*, thereby fixing the position of the grip shaft 10. This allows the auxiliary grip 1 to arbitrarily change from its vertical orientation (the orientation shown in FIG. 1) extending downward from the grip mount portion 54*a* to the lateral orientation extending to the left or right.

Figure 5:
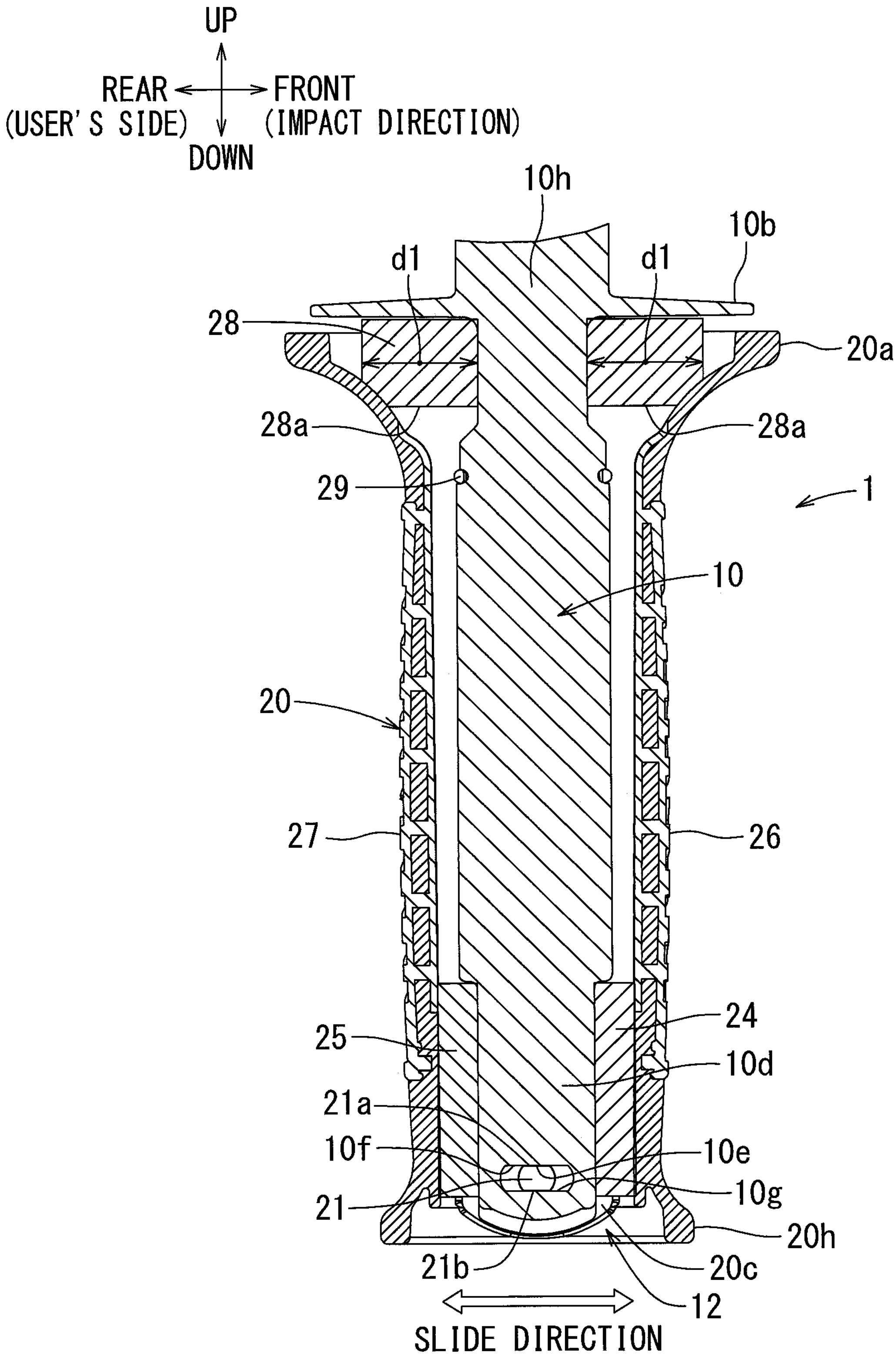
FIG. 5 is a vertical sectional view of a grip shaft and a grip body according to the first embodiment, which is a cross-sectional view taken along line V-V in FIG. 4.

As shown in FIGS. 3 to 5, the auxiliary grip 1 is provided between an end of the grip shaft 10 and the grip body 20, and includes the first pads 24, 25 configured to absorb the shock in the impact direction on the grip shaft 10 of the grip body 20. The shock in the impact direction of the grip body 20 is absorbed by the first pads 24, 25, thereby improving the shock absorbing function of the auxiliary grip 1.

As shown in FIG. 4, the grip body 20 is connected to the grip shaft 10 at its lower end via the connecting mechanism 12. The lower end of the grip shaft 10 is provided with a two-sided width portion 10*d* having left and right flat surfaces 10*da* and 10*db* at its lower end. Left and right connecting pedestals 20*b* and 20*c* are integrally formed at the lower end of the grip body 20. The two-sided width portion 10*d* of the grip shaft 10 enters between the left and right connecting pedestals 20*b* and 20*c*.

Still in FIG. 4, the left and right connecting pedestals 20*b* and 20*c* are provided with supporting holes 20*d* and 20*e*, which are coaxial with each other. The left and right supporting holes 20*d* and 20*e* are formed in a circular hole through which the connecting member 21 can be inserted. One passing through hole 10*e* is formed in the two-sided width portion 10*d* of the grip shaft 10.

As shown in FIGS. 4 and 5, the grip body 20 has a tubular shape that covers around the grip shaft 10. The grip body 20 is supported by the grip shaft 10 below the flange 10*b*. An opening 20*a* that opens laterally to form a curve is provided at the upper part of the grip body 20. The opening 20*a* is substantially covered with the flange 10*b* of the grip shaft 10. An upper end of the grip body 20 has a laterally increasing diameter to improve the gripping comfort of the auxiliary grip 1.

Figure 7:
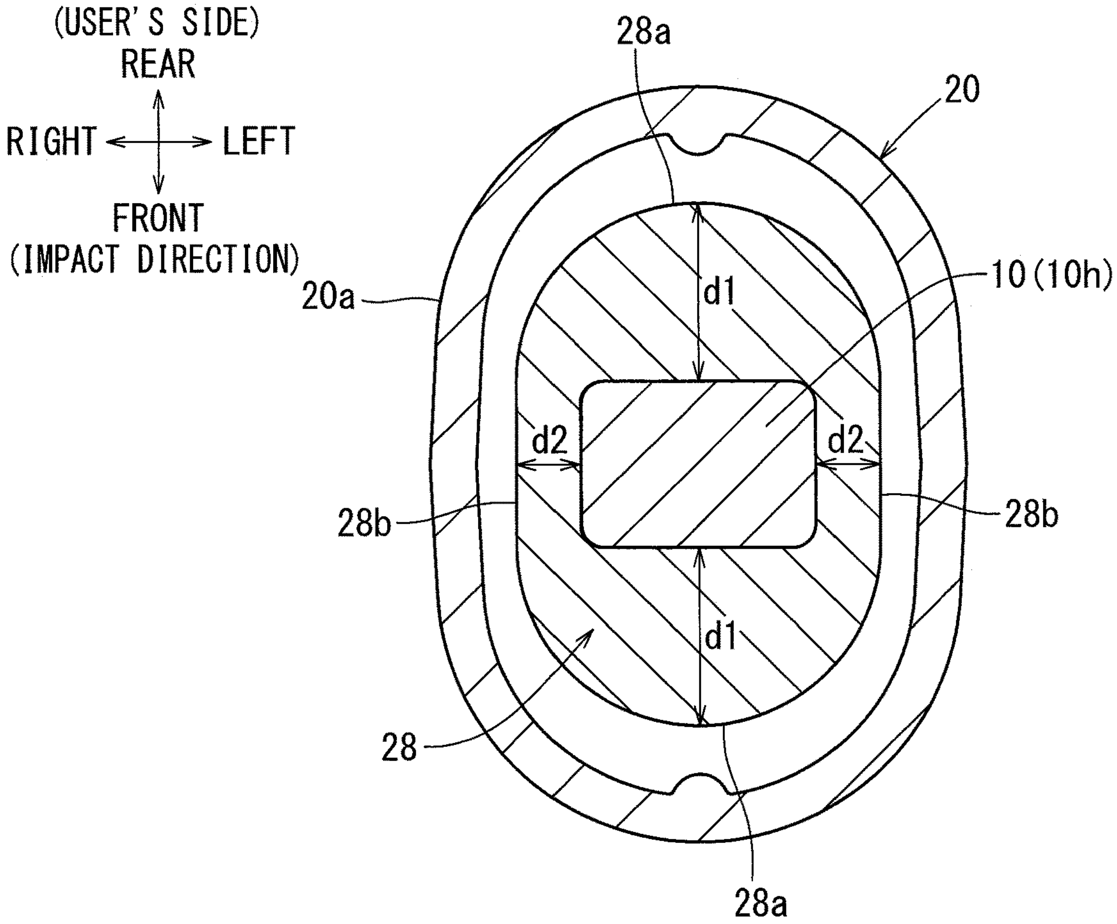
FIG. 7 is a cross-sectional view of a second pad according to the first embodiment, which is a cross-sectional view taken along line VII-VII in FIG. 4.

Still in FIGS. 4, 5 and 7, a second pad 28 is disposed between the opening 20*a* of the grip body 20 and a base 10*h* of the grip shaft 10 on the side of the tool body 51. The second pad 28 has an elongated circular shape with a vertical side 28*a* adjacent to the grip shaft 10 in the front/rear direction (impact direction) and a lateral side 28*b* adjacent to the grip shaft 10 in the left/right direction. The thickness d1 of the vertical side 28*a* is greater than the thickness d2 of the lateral side 28*b* (d1>d2). The second pad 28 absorbs the shock mainly on the upper side of the grip body 20. The second pad 28 is formed to have the thickness d1 on the vertical side 28*a* greater than the thickness d2 of the lateral side 28*b*, thereby increasing the shock absorbing capacity particularly in the front/rear direction (impact direction).

Still in FIGS. 4 and 5, a third pad 29 is attached to the grip shaft 10 below the second pad 28. The third pad 29 is attached over the entire circumference of the grip shaft 10. For example, an O-shaped rubber ring may be used for the third pad 29. When the grip body 20 is subjected to the shock that exceeds the shock absorbing capacity of the second pad 28, the grip body 20 comes into contact with the third pad 29. This prevents the grip body 20 from coming directly in contact with the grip shaft 10. As a result, the shock absorbing capacity of the auxiliary grip 1 can be increased.

Still in FIGS. 4 and 5, the grip shaft 10 is provided with a third pad 29 that is harder than the second pad 28 and comes into contact with the grip body 20 after the second pad 28 has elastically deformed. When the grip body 20 is subjected to the shock exceeding the shock absorbing capacity of the second pad 28, the third cushion 29 prevents the grip body 20 from coming directly in contact with the grip shaft 10. As a result, the shock absorbing capacity of the auxiliary grip 1 may be improved.

Still in FIGS. 4 and 5, the connecting mechanism 12 includes a passing through hole 10*e* for the grip shaft 10 to pass in a direction orthogonally to the impact direction, and the connecting member 21 passing through the through hole 10*e* and being connected to the grip body 20. The connecting member 21 is provided with flat surfaces 21*a*, 21*b* that are parallel to the impact direction. The receiving surfaces 10*f*, 10*g* of the passing through hole 10*e* come slidably in contact with the flat surfaces 21*a*, 21*b*. The connecting member 21 is therefore allowed to move in parallel in the front/rear direction within the passing through hole 10*e* with the rotation about an axis restricted. This allows a lower of the grip body 20 to be connected to the lower part of the grip shaft 10 to be slidable in the front/rear direction.

Therefore, the grip body 20 is allowed to slide in the impact direction as the connecting member 21 moves in parallel in the impact direction (radial direction of the connecting member 21) without rotating about the axis. As a result, the shock in the impact direction is absorbed.

Still in FIGS. 4 and 5, the passing through hole 10*e* of the grip shaft 10 may have a long groove hole shape elongated in the impact direction. Receiving surfaces 10*f*, 10*g* are provided on an inner surface of the passing through hole 10*e*. Therefore, the simply structured connecting mechanism 12 ensures the sliding movement with respect to the grip shaft 10 of the grip body 20.

Figure 6:
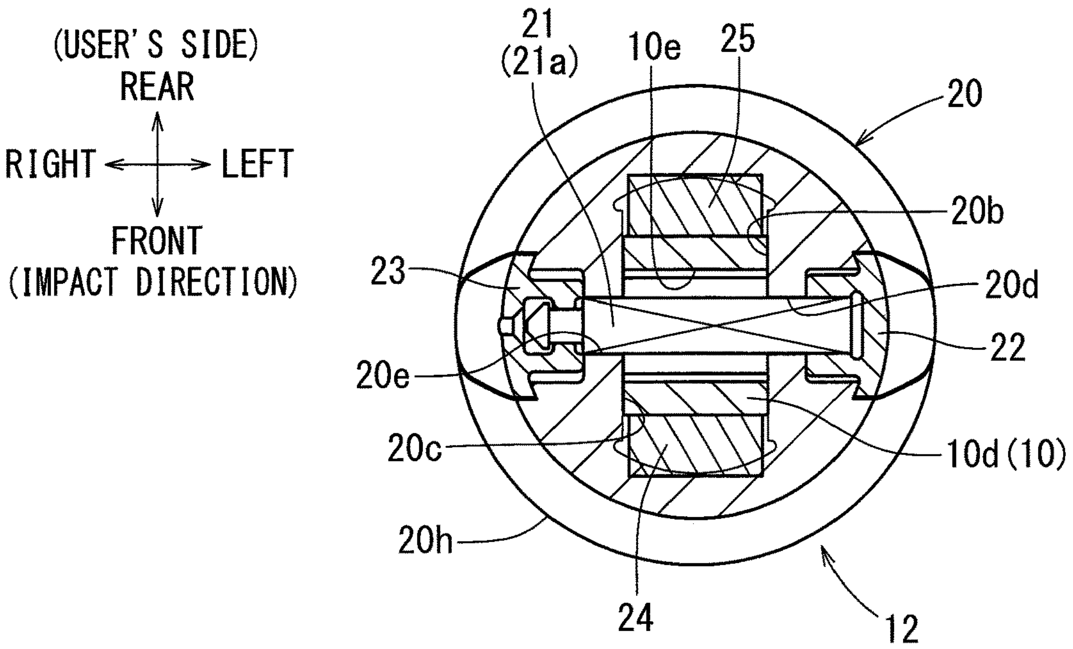
FIG. 6 is a cross-sectional view of a connecting mechanism according to the first embodiment, which is a cross-sectional view taken along line VI-VI in FIG. 4.

As shown in FIGS. 4 to 6, the passing through hole 10*e* penetrates the two-sided width portion 10*d* from left to right. FIGS. 5 and 6 show the passing through hole 10*e* has a long groove hole shape elongated in the front and rear directions. FIGS. 4 and 5 show flat receiving surfaces 10*f* and 10*g* that are parallel to each other located on the top and bottom of the passing through hole 10*e*.

Still in FIGS. 4 to 6, a single connecting member 21 is inserted to extend over between the left and right supporting holes 20*d*, 20*e* and the passing through hole 10*e*. As the parallel upper and lower flat surfaces 21*a*, 21*b* are provided on the connecting member 21, the connecting member 21 is allowed to move in parallel in the front and rear directions within the passing through hole 10*e* while the rotation about the axis is restricted. A lower part of the grip body 20 is connected to a lower part of the grip shaft 10 via the connecting mechanism 12 with this configuration to be slidable in the front and rear directions.

As shown in FIGS. 6 and 7, left and right ends of the connecting member 21 project into the recesses 20*f*, 20*g* formed on the grip body 20. The recesses 20*f*, 20*g* are covered with respective caps 22, 23. The caps 22, 23 cover the left and right ends of the connecting member 21. The lower part of the grip body 20 is provided with an enlarged diameter portion 20*h* with the diameter enlarged to form a curved shape. The left and right caps 22, 23 are fitted into the recesses 20*f*, 20*g* so as not to project along the curved shape of the enlarged diameter portion 20*h*. The enlarged diameter portion 20*h* restricts the lower end of the grip portion of the grip body 20, thereby improving the gripping comfort of the auxiliary grip 1.

As shown in FIGS. 1, 2, 3 and 5, the front and rear sides of the grip body 20 are covered with the elastomer layers 26, 27, respectively. The elastomer layers 26, 27 serve to prevent the user's hands from slipping and to absorb the shock in the impact direction. The elastomer layers 26, 27 cover only the front and rear sides of the grip body 20, and the left and right sides are not covered with the elastomer layer. The elastomer layers 26, 27 are integrally formed with the grip body 20, which is a harder resin layer.

As shown in FIG. 5, the auxiliary grip 1 is disposed between the base 10*h* of the grip shaft 10 on the side of the tool body 51 and the grip body 20. The second pad 28 absorbs the shock in the impact direction on the grip shaft 10 of the grip body 20. The thickness d1 of the vertical side 28*a* of the second pad 28 is formed to have a greater thickness (d1>d2) than the thickness d2 of the lateral side 28*b*, thereby improving the shock absorbing capacity in the impact direction.

As shown in FIG. 6, the shock in the impact direction is absorbed at the connecting mechanism 12 of the auxiliary grip 1 as the grip body 20 slidably moves in the impact direction with respect to the grip shaft 10. This improves the shock absorbing function in the impact direction for the user holding the grip body 20. The connecting member 21 extends in the left/right direction with respect to the grip shaft 10 and moves in the radial direction (front/rear direction), thereby causing the grip body 20 to slide in the impact direction. As a result, the strain on the user of the impact tool 50 may be reduced.

As shown in FIG. 5, the grip body 20 has elastomer layers 26, 27 on a front surface and a rear surface (outer surface in the impact direction). Therefore, the shock in the impact direction may also be absorbed by the elastomer layers 26, 27, thereby further reducing the strain on a user.

As shown in FIGS. 8 to 11, an auxiliary grip 2 according to the second embodiment is illustrated. The auxiliary grip 2 of the second embodiment is mounted on the cylindrical grip mounting portion 54*a* provided at the front of the body housing 54 similar to the first embodiment. The auxiliary grip 2 of the second embodiment includes a grip shaft 30 and a grip body 40. The grip shaft 30 extends from the grip mounting portion 54*a* in a direction substantially orthogonal to the impact direction.

Figure 8:
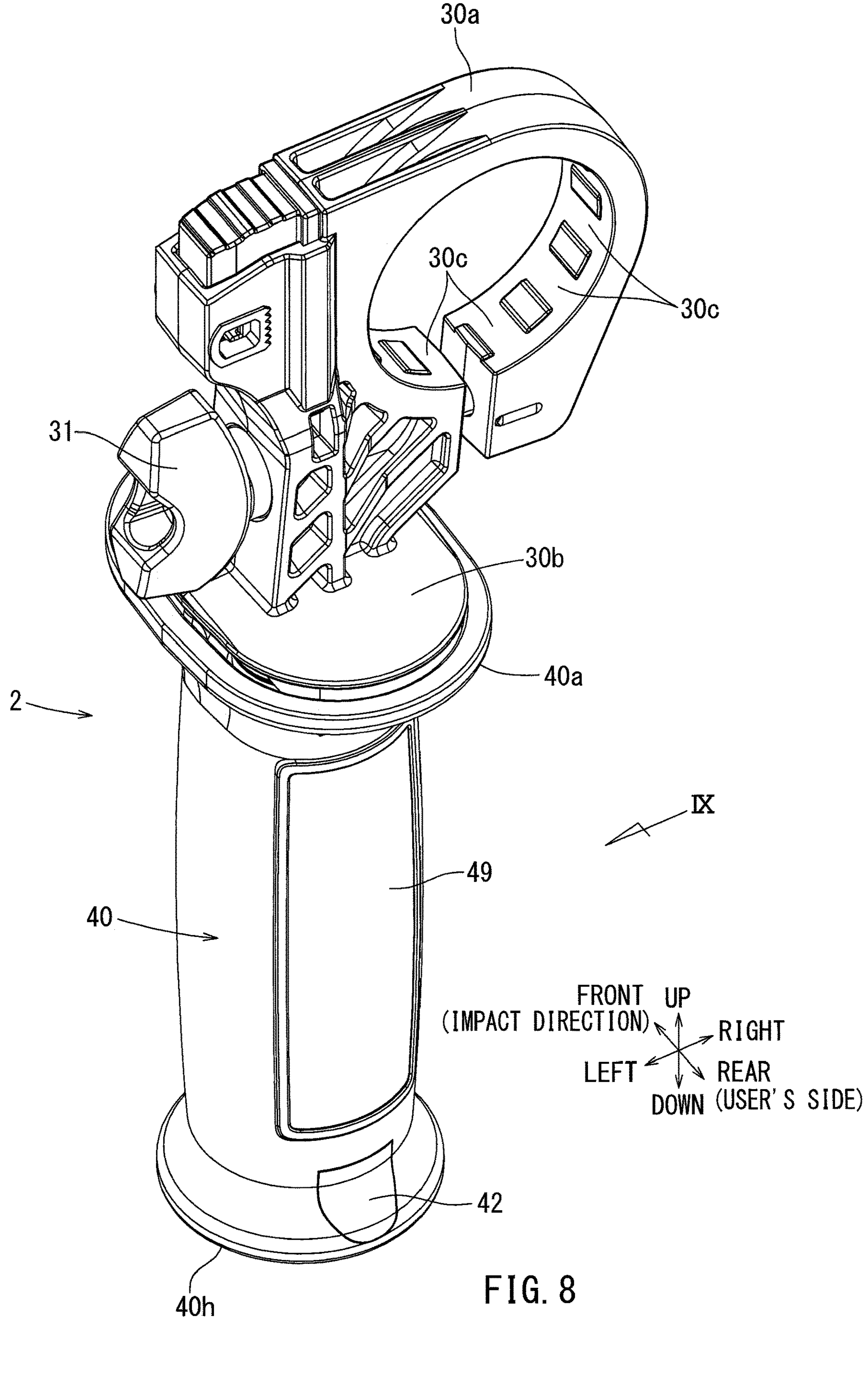
FIG. 8 is a perspective view of the auxiliary grip according to a second embodiment.
Figure 9:
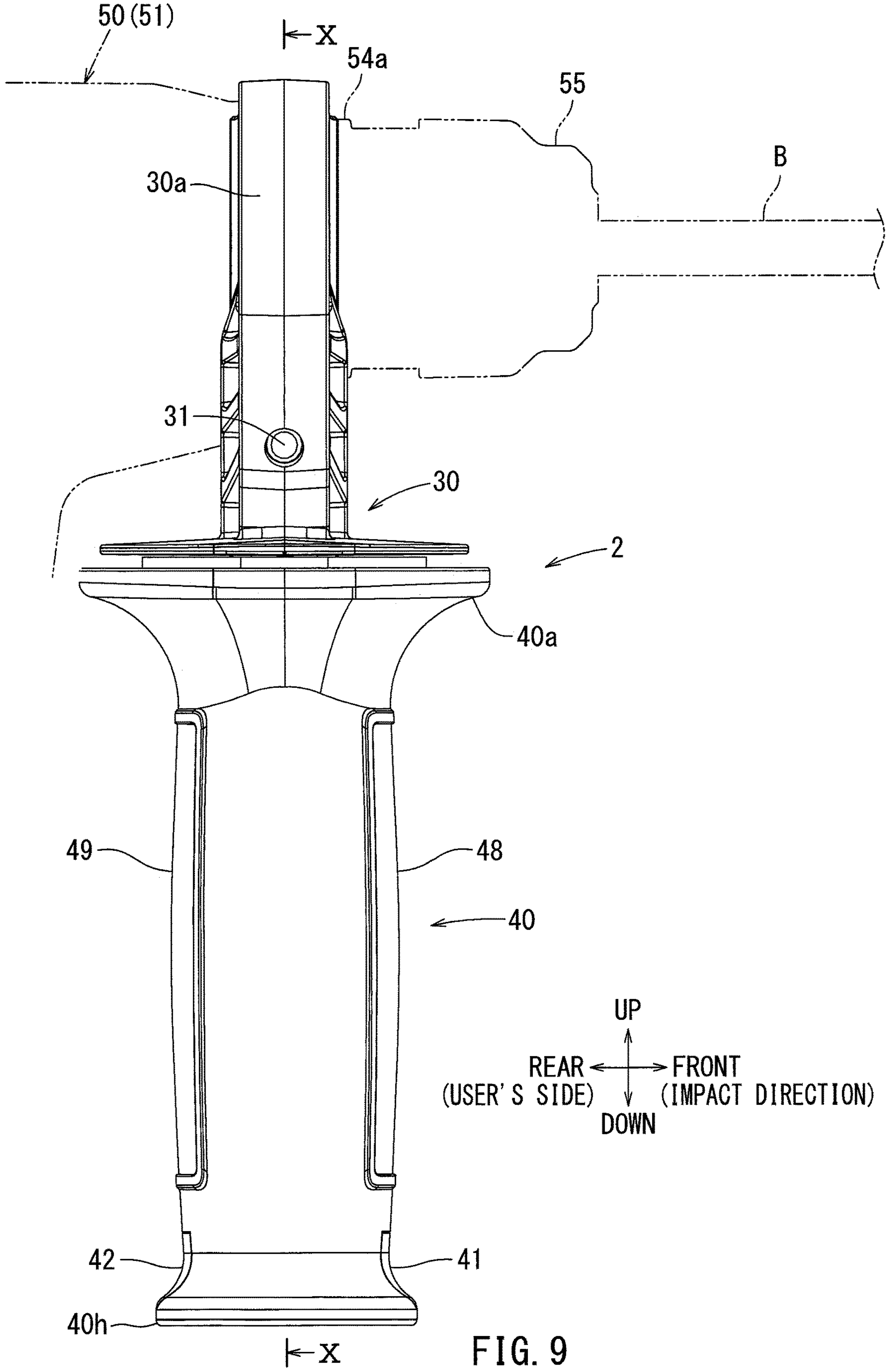
FIG. 9 is a right-side view of the auxiliary grip according to the second embodiment, which is a view as seen from an arrow IX in FIG. 8.
Figure 10:
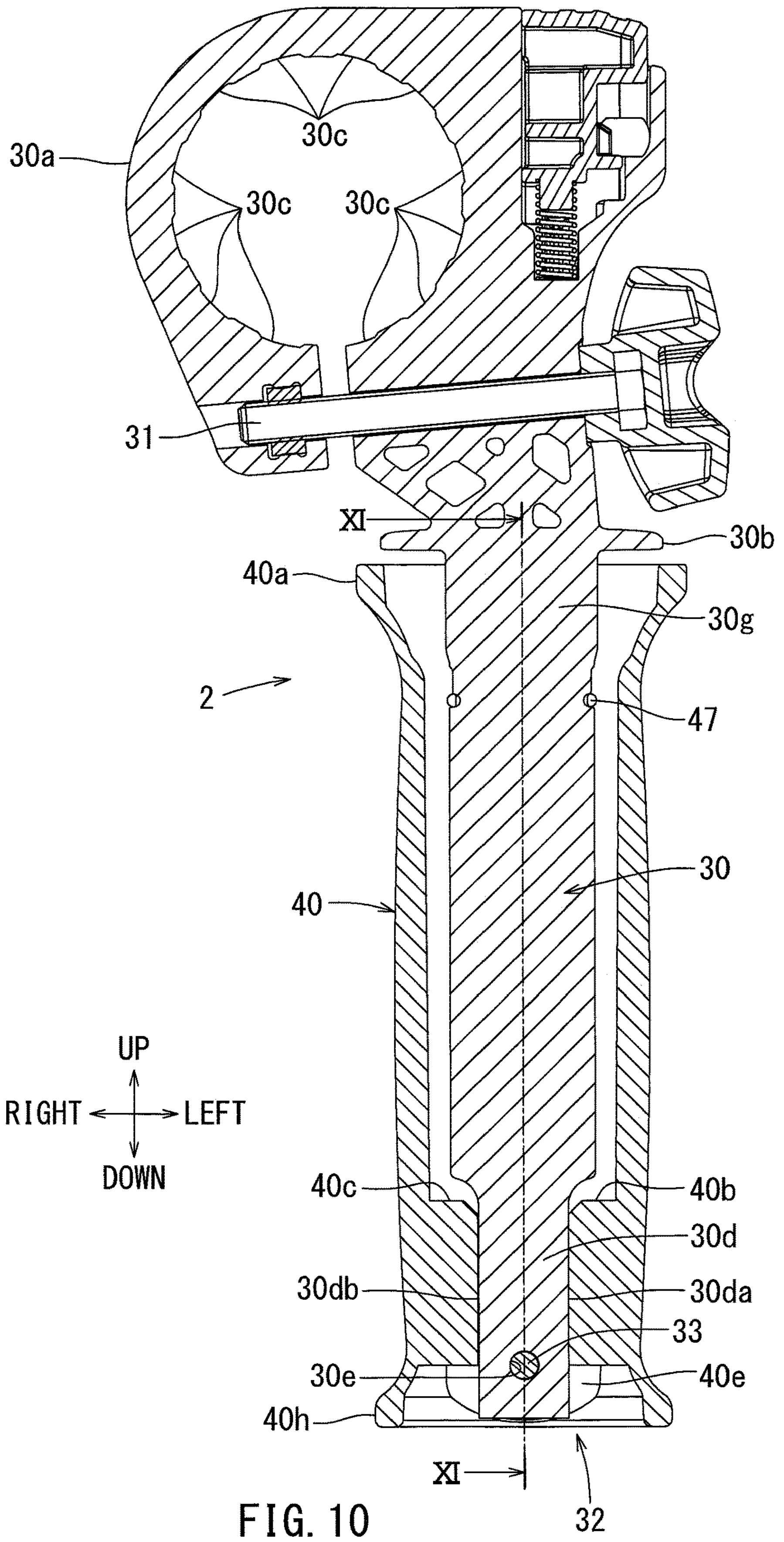
FIG. 10 is a vertical sectional view of the auxiliary grip according to the second embodiment, which is a cross-sectional view taken along line X-X in FIG. 9.

As shown in FIGS. 8 to 10, an elongated circular flange 30*b* and an annular tightening portion 30*a* are integrally formed at an upper part of the grip shaft 30. The tightening portion 30*a* displaces in a diameter reduction direction by tightening a fixing screw 31. Tightening the fixing screw 31 with the grip mounting portion 54*a* positioned on the inner circumferential side of the tightening portion 30*a* allows the grip shaft 30 to couple with the grip mounting portion 54*a*.

Still in FIGS. 8 to 10, a plurality of engagement recesses 10*c* is provided on the inner circumferential side of the tightening portion 30*a*. A position of the grip shaft 30 around the output axis P is fixed when an engagement projection 54*b* on the side of the grip mounting portion 54*a* (see FIG. 1) is fitted into any one of the engagement recesses 10*c*.

As shown in FIG. 9, by loosening the fastening screw 31, the connection of the tightening portion 30*a* to the grip mounting portion 54*a* is released so that the auxiliary handle 2 can be removed from the grip mounting portion 54*a*. Further, loosening the connection of the tightening portion 30*a* with the grip mounting portion 54*a* makes it possible to change the position of the grip shaft 30 around the output axis P.

Figure 11:
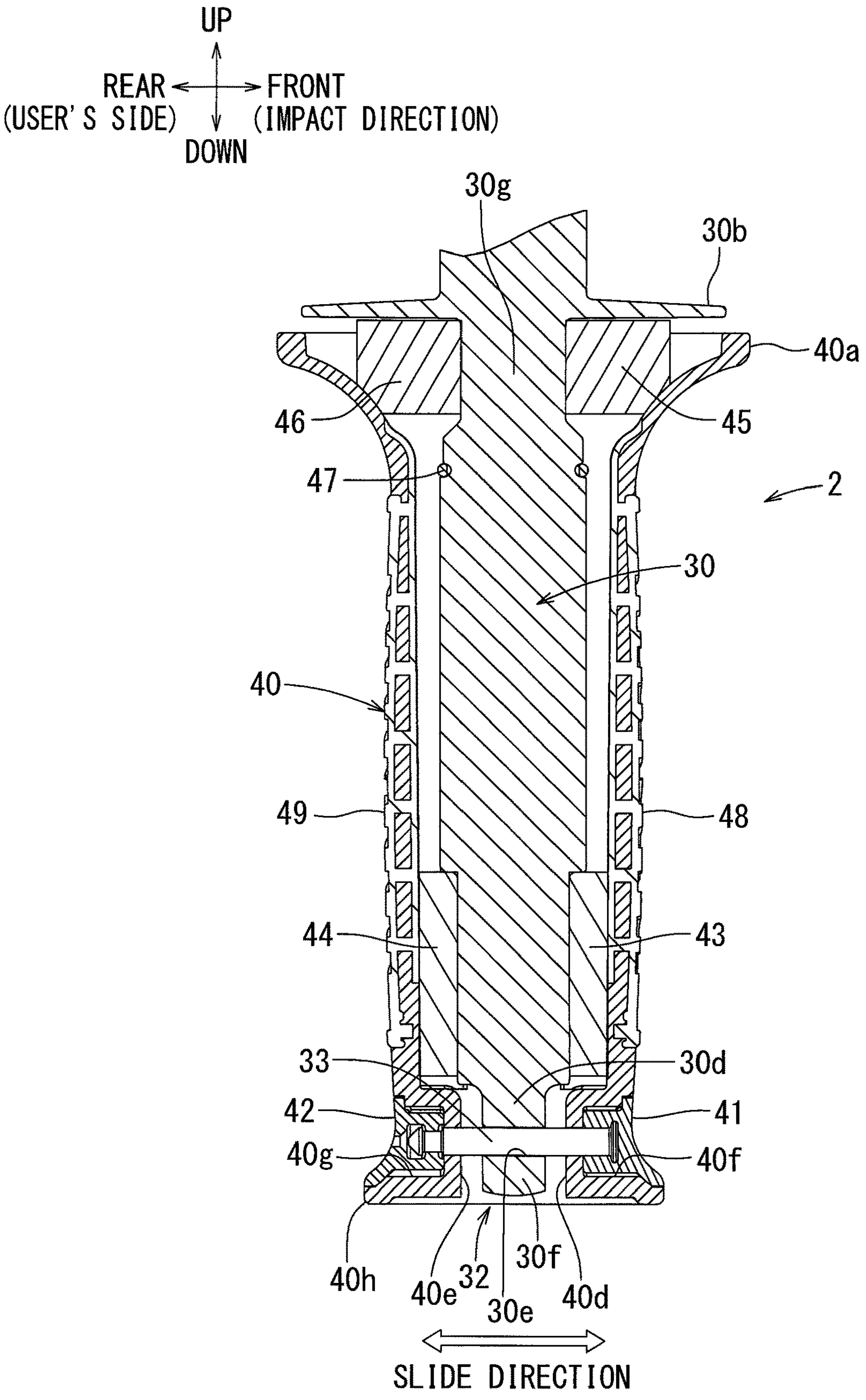
FIG. 11 is a vertical sectional view of a grip shaft and a grip body according to second embodiment, which is a cross-sectional view taken along line XI-XI in FIG. 10.

As shown in FIGS. 10 and 11, the grip body 40 has a tubular shape that covers around the grip shaft 30. The grip body 40 is supported by the grip shaft 30 below the flange 30*b*. An opening 40*a* that opens laterally to form a curve is provided at the upper part of the grip body 40. The opening 40*a* is substantially covered with the flange 30*b* of the grip shaft 30. An upper end of the grip portion of the grip body 40 with a laterally increasing diameter improves the gripping comfort of the auxiliary grip 2.

As shown in FIG. 10, the grip body 40 is connected to the grip shaft 30 at its lower end via the connecting mechanism 32. The lower end of the grip shaft 30 is provided with a two-sided width portion 30*d* having left and right flat surfaces 30*da* and 30*db* at its lower end. The left and right connection pedestals 40*b* and 40*c* are integrally formed at the lower end of the grip body 40. The two-sided width portion 30*d* of the grip shaft 30 enters between the left and right connecting pedestals 40*b* and 40*c* to be relatively deformable in the front/rear direction.

Still in FIG. 10, a passing through hole 30*e* is formed in the two-sided width portion 30*d* of the grip shaft 30. The passing through hole 30*e* is positioned with its axis being parallel to the flat surfaces 30*da*, 30*db* of the two-sided width portion 30*d*. One connecting member 33 is inserted into the passing through hole 30*e*. The connecting member 33 is inserted to be movable in the axis direction with respect to the passing through hole 30*e*.

As shown in FIG. 11, a narrow portion 30*f* is provided at the lower part of the grip shaft 30 with its width narrowed in the front/rear direction. The narrow portion 30*f* is formed with the lower part of the two-sided width portion 30*d* narrowed in the front/rear direction. The connecting member 33 projects forward and rearward from the narrow portion 30*f*.

Still in FIG. 11, supporting pedestals 40*d*, 40*e* are provided at the front and rear of the lower inner circumference of the grip body 40. The narrow portion 30*f* of the grip shaft 30 enters between the support pedestals 40*d*, 40*e*. The interval between the front and rear supporting pedestals 40*d*, 40*e* is determined to allow the narrow portion 30*f* to be displaceable in the front/rear direction by a sufficient distance.

Still in FIG. 11, front and rear portions of the connecting member 33 are supported by the front and rear supporting pedestals 40*d*, 40*e*. The connecting member 33 is non-movably supported to the supporting pedestals 40*d*, 40*e* in the axial direction. Both the front and rear ends of connecting member 33 project into the recesses 40*f*, 40*g* formed in the grip body 40. The recesses 40*f*, 40*g* are covered with the caps 41, 42, respectively. The caps 41, 42 cover the left and right ends of the connecting member 33. The lower part of the grip body 40 is provided with an enlarged diameter portion 40*h* with the diameter enlarged forming a curved shape. The left and right caps 41, 42 are fitted into the recesses 40*f*, 40*g* so as not to project along the curved shape of the enlarged diameter portion 40*h*.

Still in FIG. 11, first pads 43, 44 are disposed between a front side of the two-sided width portion 30*d* of the grip shaft 30 and the grip body 40 as well as between a rear side of the two-sided width portion 30*d* and the grip body 40, respectively. The first pads 43, 44 absorb the shock in the impact direction on the grip body 40.

Still in FIG. 11, second pads 45, 46 are disposed between the opening 40*a* of the grip body 40 and the base 30*g* of the grip shaft 30 on the side of the tool body 51. The second pads 45, 46 are disposed on the front side and the rear side of the impact direction with respect to the base 30*g* of the grip shaft 30. The front and rear second pads 45, 46 absorb the shock mainly on the top side of the grip body 40.

Still in FIG. 11, a third pad 47 is attached to the grip shaft 30 below the second pads 45, 46. The third pad 47 is attached over the entire circumference of the grip shaft 30. For example, an O-shaped rubber ring may be used for the third pad 47. When the grip body 40 is subjected to a shock exceeding the shock absorbing capacity of the second pads 45, 46, the grip body 40 comes into contact with the third pad 47. This allows the grip body 40 to avoid coming directly in contact with the grip shaft 30. As a result, the shock absorbing capacity of the auxiliary grip 2 can be improved.

As shown in FIGS. 8, 9, 11, the front and rear sides of the grip body 40 are respectively covered with the elastomer layers 48, 49. The elastomer layers 48, 49 serve to prevent slippage of the user's hands and absorb the shock in the impact direction. Similar to the first embodiment, the elastomer layers 48, 49 only cover the front and rear sides of the grip body 40, and the left and right sides are not covered with the elastomer layer. The elastomer layers 48, 49 are integrally formed with the grip body 40, which is a harder resin layer.

As shown in FIGS. 9 to 11, the shock in the impact direction is absorbed at the connecting mechanism 32 of the auxiliary grip 2 as the grip body 40 slidably moves in the impact direction with respect to the grip shaft 30. This improves the shock absorbing function in the impact direction for the user holding the grip body 40. As a result, the strain on the user of the impact tool 50 may be reduced.

As shown in FIGS. 10 and 11, the connecting mechanism 32 includes a passing through hole 30*e* for the grip shaft 30 to pass through in the impact direction and a connecting member 33 inserted into the passing through hole 30*e* so as to be displaceable in the axial direction. The connecting member 33 moves within the passing through hole 30*e* of the grip shaft 30 in the impact direction (axial direction of the connecting member 33) to cause the grip body 40 to slide in the impact direction with respect to the grip shaft 30. As a result, the shock on the grip body 40 is absorbed.

Still in FIGS. 10 and 11, the connecting member 33 extend in the front/rear direction with respect to the grip shaft 30 and move in the axial direction (front/rear direction), thereby causing the grip body 40 to slide in the impact direction.

Although a hammer drill that strikes while rotating the drill bit B is illustrated herein as an impact tool, the illustrated auxiliary grips 1 and 2 may be applied to any impact tools that merely strike against the tool bit, such as hammer tools used, for example, for chipping work. Further, the connecting mechanisms 12, 32 may be applied to any auxiliary grips that are removable from any tool body.

The impact tool may be either a DC machine using a rechargeable battery pack 70 as a power source or an AC machine utilizing a commercial power source.

The auxiliary grip 1 of the first embodiment and the auxiliary grip 2 of the second embodiment are some examples of auxiliary grips for an impact tool in one aspect of the present disclosure. The drill bit B of the first and second embodiments is one example of a tool bit in one aspect of the present disclosure. The tool body 51 in the first and second embodiments is one example of a tool body in one aspect of the present disclosure.

The front side in the first and second embodiments is one example of the impact direction in one aspect of the present disclosure. The grip shaft 10 in the first embodiment and the grip shaft 30 in the second embodiment are some examples of the grip shaft in one aspect of the present disclosure. The grip body 20 in the first embodiment and the grip body 40 in the second embodiment are some examples of the grip body in one aspect of the present disclosure. The connecting mechanism 12 in the first embodiment and the connecting mechanism 32 in the second embodiment are some examples of the connecting mechanism in one aspect of the present disclosure.

The various examples described above in detail with reference to the attached drawings are intended to be representative of the present disclosure and are thus non-limiting embodiments. The detailed description is intended to teach a person of skill in the art to make, use and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved auxiliary grip for an impact tool, and/or methods of making and using the same.

What is claimed is:

1. An auxiliary grip for an impact tool comprising:

a tightening portion along an outer surface of a tool body configured for a tool bit to reciprocally move in an impact direction;

a fixing member extending between ends of the tightening portion and being configured to close together the ends for the tightening portion to secure the outer surface of the tool body;

a grip shaft extending from the tightening portion in a direction orthogonally to the impact direction;

a tubular grip body being configured to cover the grip shaft; and a connecting mechanism being configured to connect the grip body at an end of the grip shaft, and a guide surface provided at the grip shaft and facing in a left-right direction orthogonally to an extension direction of the grip shaft and orthogonally to the impact direction;

wherein the grip body is slidable along the guide surface in the impact direction against the grip shaft and is restricted from moving in the left-right direction by the guide surface.

2. The auxiliary grip of claim 1, further comprising a first pad disposed between the end of the grip shaft and the grip body to absorb a shock in the impact direction against the grip shaft of the grip body.

3. The auxiliary grip of claim 2, further comprising a second pad disposed between a base of the grip shaft on a side of the tool body and the grip body to absorb a shock in the impact direction against the grip shaft of the grip body.

4. The auxiliary grip of claim 3, wherein the second pad includes a lateral side being adjacent to the grip shaft in a direction orthogonally to the impact direction and a vertical side having a greater thickness than the lateral side, wherein the vertical side being adjacent to the grip shaft in the impact direction.

5. The auxiliary grip of claim 3, further comprising a third pad being configured to come into contact with the grip body when the second pad has elastically deformed.

6. The auxiliary grip of claim 5, wherein the third pad is provided on the grip shaft.

7. The auxiliary grip of claim 5, wherein the third pad is harder than the second pad.

8. The auxiliary grip of claim 1, wherein:

the connecting mechanism includes a connecting member passing through the grip shaft in the left-right direction wherein left and right ends of the connecting member are connected to the grip body, the guide surface is formed with an elongated hole in the impact direction in which the connecting member is inserted, and the connecting member is slidable in the impact direction along the elongated hole so that the grip body slides against the grip shaft in the impact direction.

9. The auxiliary grip of claim 1, wherein the connecting mechanism includes a connecting member passing through the grip shaft in the impact direction, and wherein the grip body is slidable along the connecting member in the impact direction.

10. The auxiliary grip of claim 1, wherein:

the grip body includes an elastomer layer on at least one outer surface in the impact direction, and the elastomer layer is integrally formed with a resin layer, and wherein the resin layer is harder than the elastomer layer.

11. An auxiliary grip for an impact tool for enhancing a shock absorbing function, the auxiliary grip comprising:

a grip shaft being configured for a tool bit to reciprocally move in an impact direction;

a tubular grip body being configured to cover the grip shaft;

a connecting mechanism being configured to connect the grip body at an end of the grip shaft, wherein the grip body is slidable in the impact direction; and a plurality of pads for absorbing the shock, wherein the plurality of pads comprises a first pad disposed between the end of the grip shaft and the grip body to absorb a shock in the impact direction against the grip shaft of the grip body, a second pad disposed between a base of the grip shaft on a side of a tool body and the grip body to absorb a shock in the impact direction against the grip shaft of the grip body, and a third pad being configured to contact with the grip body when the second pad has elastically deformed.

* * * * *